March 16, 1943.    T. F. McCARTHY    2,314,009
LOADING APPARATUS
Filed June 5, 1941    3 Sheets-Sheet 1

INVENTOR
Timothy F. McCarthy
BY
Clarence F. Poole
ATTORNEY

March 16, 1943.　　T. F. McCARTHY　　2,314,009
LOADING APPARATUS
Filed June 5, 1941　　3 Sheets-Sheet 2
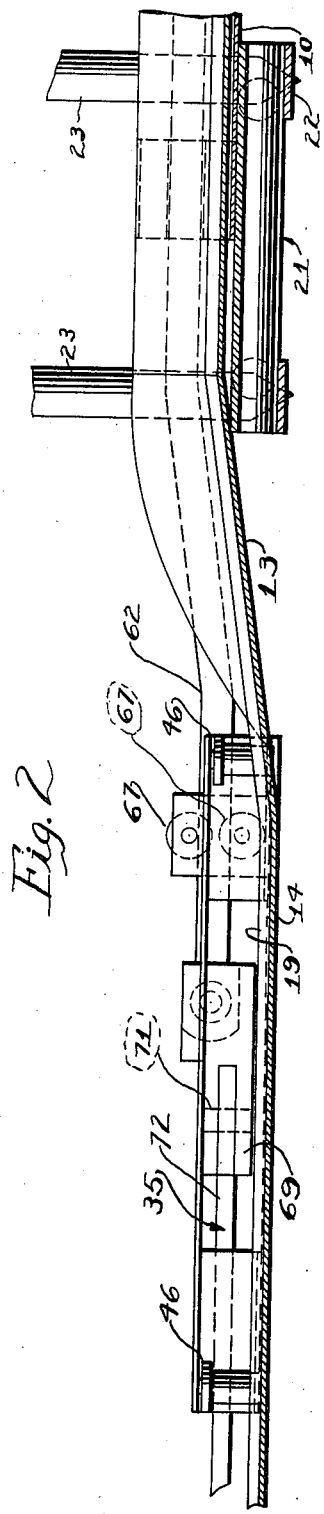
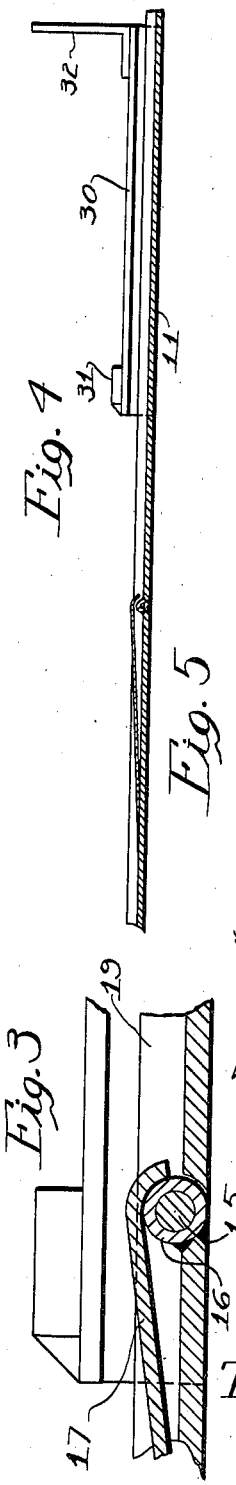
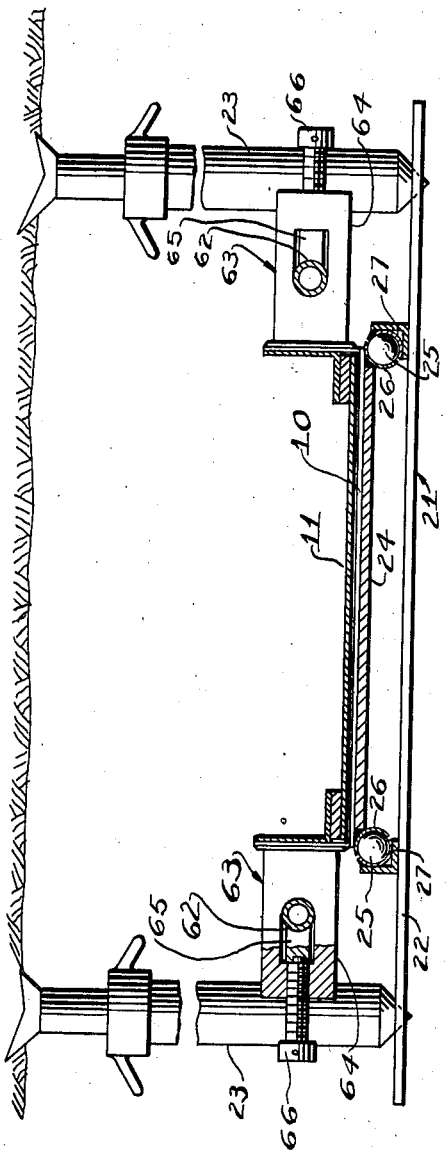
INVENTOR
Timothy F. McCarthy
BY
Clarence F. Poole
ATTORNEY March 16, 1943.  T. F. McCARTHY  2,314,009
LOADING APPARATUS
Filed June 5, 1941  3 Sheets-Sheet 3
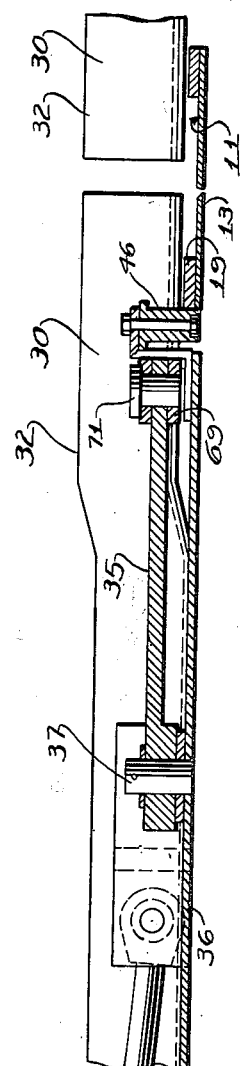
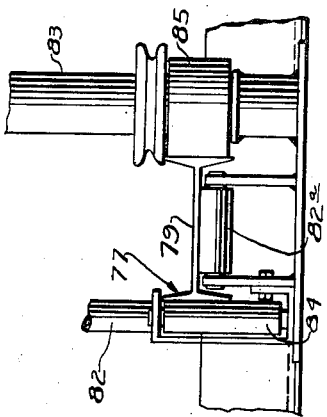
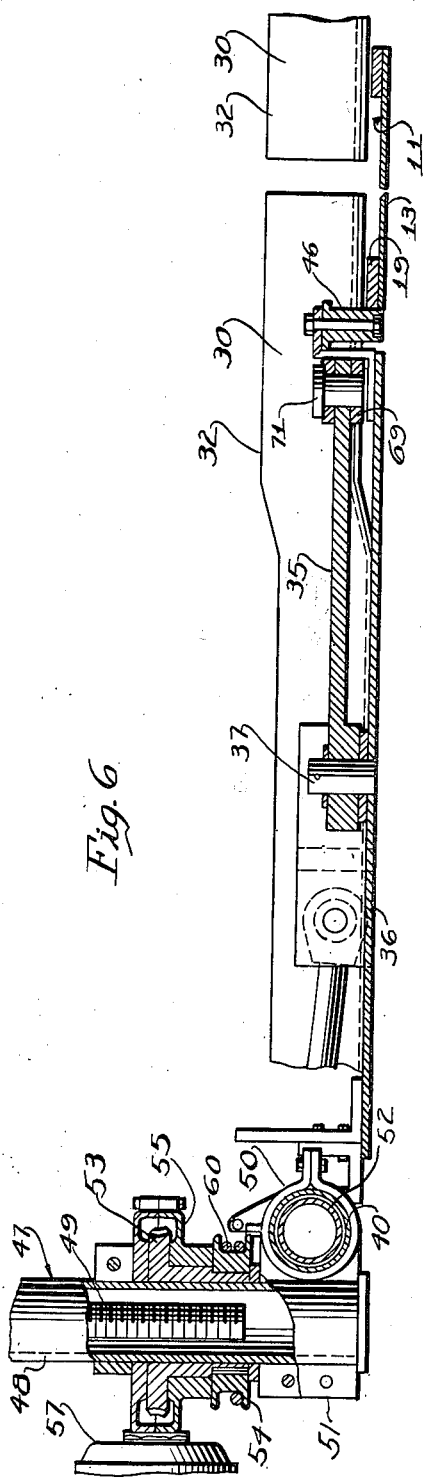
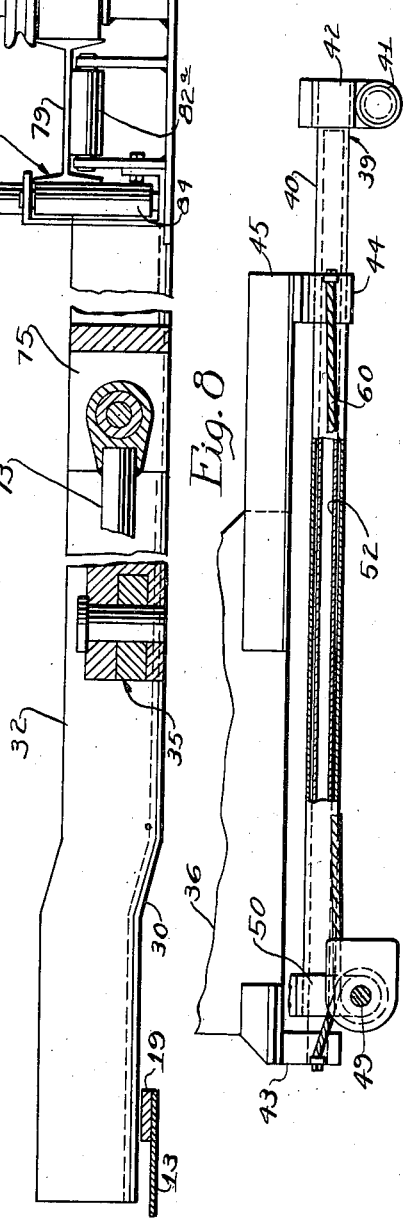
INVENTOR
Timothy F. McCarthy
BY
Clarence J. Poole
ATTORNEY Patented Mar. 16, 1943

2,314,009

UNITED STATES PATENT OFFICE 2,314,009

LOADING APPARATUS

Timothy F. McCarthy, Indiana, Pa.

Application June 5, 1941, Serial No. 396,695

7 Claims. (Cl. 198—220)

This invention relates to improvements in loading apparatus, and more particularly relates to a novel form of shaker conveyer loading apparatus, for picking up mined material such as coal from the working face of a mine.

The principal objects of my invention are to provide a device for loading mined material from the working face of a mine, which is adapted to be driven by a trough line of a shaker conveyer and to be extended with respect to the trough line into the broken down coal, for loading onto the shaker conveyer trough line.

A more specific object of my invention is to provide a loading apparatus for a shaker conveyer trough line including an extensible pan on the forward end of the trough line, which is adapted to rest on the mine bottom and be placed in the undercut in the coal face, before the shooting operation, and have the coal shot directly thereon, and also including face loading pans reciprocably driven by the shaker conveyer and disposed on opposite sides of said loading pan in parallel relation with respect to the working face, for picking up loose material and loading it onto said loading pan.

Other objects of my invention will appear from time to time as the following specification proceeds and with reference to the accompanying drawings wherein:

Figure 2 is an enlarged fragmentary sectional view taken substantially along line 2—2 of Figure 1;

Figure 3 is an enlarged detail sectional view taken substantially along line 3—3 of Figure 1, and showing certain details of the hinged connection of the loading pan of the shaker conveyer trough line;

Figure 4 is a longitudinal sectional view drawn to substantially the same scale as Figure 2 and taken along line 4—4 of Figure 1;

Figure 5 is an enlarged transverse sectional view taken substantially along line 5—5 of Figure 1 and showing certain details of the drive connection to the loading pans;

Figure 6 is an enlarged sectional view taken substantially along line 6—6 of Figure 1;

Figure 7 is an enlarged sectional view taken substantially along line 7—7 of Figure 1; and Figure 8 is an enlarged detail view, with certain parts broken away in order to show certain details of the guiding and feeding means for advancing the base for the drive connection for the face loading pan.

Figure 1:
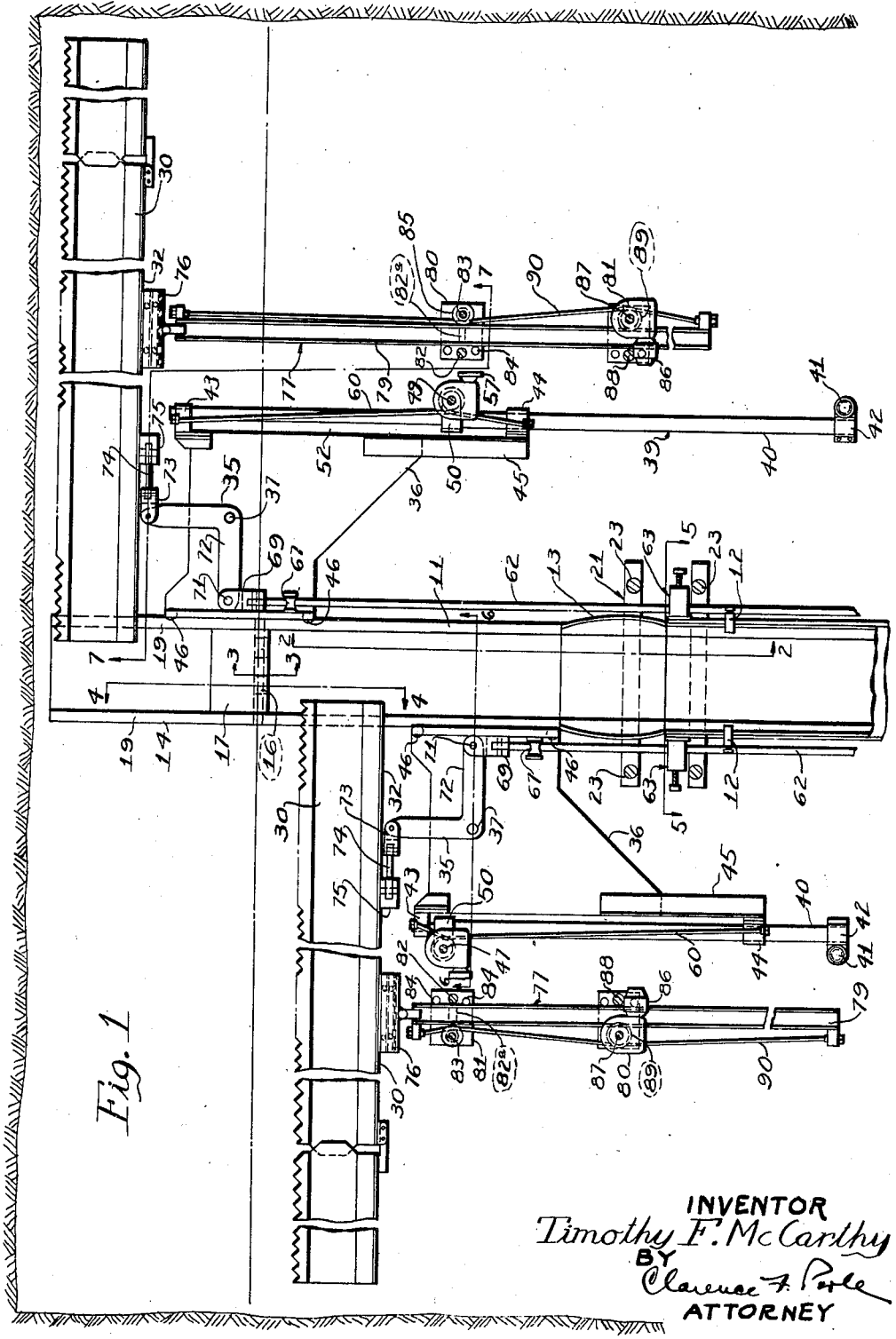
Figure 1 is a plan view of a loading device constructed in accordance with my invention.

In the drawings, a reciprocating trough section 10 is provided on the forward end of a shaker conveyer pan line (not shown). Said shaker conveyer pan line and reciprocating trough section are reciprocably driven in a manner to cause movement of material along said trough section in a direction away from the working face, by means of a suitable drive mechanism (not shown) in a manner well known to those skilled in the art. A loading pan 11 is nested in the forward end of said reciprocating trough section and is secured thereto for reciprocation with said reciprocating trough section by means of clamps 12, 12, clamping the side walls of said trough sections together.

The loading pan 11 is provided with an inclined portion 13 which terminates into a horizontal forwardly extending portion 14 slidably engaging the ground in advance of said reciprocating trough section. Said horizontal forwardly extending portion is transversely hinged by means of a hinge pin 15 extending through interleaving portions 16, 16 of said loading pan. A shield 17 extends over said interleaving portions, to provide for the free passage of material upwardly along said loading pan. Relatively low retaining members 19, 19 extend along opposite sides of said loading pan, for retaining material thereon. During the gathering operation the forward end of said loading pan is adapted to be inserted in the undercut, and material is adapted to be shot down thereon, so said loading pan may progress the material onto the reciprocating trough section 10.

The reciprocating trough section 10 is mounted at its forward end on a ball frame generally indicated by reference character 21. Said ball frame includes a base 22 adapted to be held in stationary position with respect to the ground by means of a plurality of holding jacks 23, 23 and an upper frame member 24, forming a support for the forward end of said reciprocating trough section and mounted on said base on balls 25, 25, guided in raceways 26 and 27 extending longitudinally of the trough line. Said raceways are of a semi-cylindrical formation and form a means for guiding said reciprocating trough section against lateral displacement, as well as an antifriction support for said reciprocating trough section.

Face loading pans 30, 30 are herein shown as being provided on opposite sides of the loading pan 11, in substantially perpendicular relation with respect thereto, for conveying the broken down material onto said loading pan 11. Each of said loading pans is driven from the conveyer pan line, and the mounting for each of said face loading pans and the drive thereto from the conveyer pan line is of a similar construction, so only one of said loading pans will herein be described in detail.

The face loading pan 30 is a relatively flat pan adapted to rest on the ground and having an upwardly inclined discharge end spaced above the ground, for discharging material onto the loading pan 11 (see Figure 7). Said face loading pan has a serrated advance agitating edge 31 and a rear retaining wall 32 extending for the full length thereof.

The drive for said loading pan from the conveyer trough line includes a bell crank 35 vertically pivoted on a base plate 36 on a vertical shaft 37. Said base plate is adapted to be held stationary during the loading operation by means of suitable jacks or the like, interposed between the top of said base plate and the mine roof, and is guided during advancing movement thereof and is also held in position by means of a guiding member 39 extending longitudinally of the reciprocating trough section 10.

The guiding member 39, as herein shown, includes a longitudinally extending tube 40 clamped at its rear end to a jack 41, by means of a clamping collar 42. Said tube is clamped at its front end to a jack 47 by means of a clamping collar 50, mounted on a bracket member 51. A tube 52 is slidably guided within the tube 40 and forms a slidable guide for the base plate 36. Said tube is secured at its free end to the advance end of said base plate by means of a clamping collar 43. A guiding collar 44 is mounted on a rearward extension 45 from said base and has slidable engagement with said tube 40. If desired, said guiding collar 44 may be arranged to be clamped to said tube during the loading operation, to aid in holding said base in position.

The jack 47 forms a mounting for the means for moving the base 36 along the ground and includes a column 48, adapted to engage the ground at its base and having a member 49 threaded therein (see Figure 6). Said threaded member is provided with means on the upper end thereof (not shown), for engaging the roof, to hold said jack firmly in position between the mine roof and bottom.

A worm gear 53 is rotatably mounted on said column just above the bracket member 51, and has a winding drum 54 keyed on its hub, adjacent the lower end thereof (see Figure 6). Said worm gear is mounted in a housing 55, encircling said column, and is driven from a motor 57 mounted on and projecting from said housing. The drive from said motor to said worm gear includes a worm (not shown) on the shaft for said motor and meshing with said worm gear. A flexible feeding member 60 is wrapped around the winding drum 54 and is secured at its ends to the collars 43 and 44, for feeding said base longitudinally of the reciprocating trough section 10, upon rotation of the motor 57. When the feeding operation has been completed, said guiding collar 44 may be clamped in engagement with the tube 40, to aid in holding said base in position on the ground during the conveying operation. Spaced rollers 46, 46 mounted on said base are adapted to engage the sides 19, 19 of the extensible trough section 11, to form an anti-friction guide therefor.

The drive from the reciprocating trough section 10 to the bell crank 35 includes a drive link 62 which is herein shown as being of a length sufficient to permit driving of said bell crank from the trough section 10, during various positions of extension of the face loading pan 30 and base 36, without requiring the insertion of additional troughs in the trough line. A clamping member 63, secured to and projecting laterally from a side wall of the reciprocating trough section 10 is provided to engage and reciprocably move said drive link, upon reciprocable movement of said trough section (see Figures 1 and 5). Said clamping member, as herein shown, includes an apertured block 64, through which said drive link is adapted to extend, and an engaging member 65 engaged with said drive link by means of a screw 66. Said drive link is guided against vertical displacement by means of rollers 67, 67, through which said drive link extends, and is transversely pivoted at its forward end to a connecting member 69. Said connecting member is in turn connected to the free end of a lever arm 72 of said bell crank by means of a vertical pin 71.

The other lever arm of the bell crank 35 has a connecting member 73 vertically pivoted to the free end thereof. A link 74 is transversely pivoted to said connecting member at one of its ends and is transversely pivoted to a bracket member 75, secured to and projecting rearwardly from the retaining wall 32.

A means is provided for advancing the loading pan 30 during the loading operation which is similar to that disclosed in my companion application Serial No. 396,507, filed herewith, and which includes a ball frame 76 forming a slidable guiding support for the rear end of said loading pan, for holding said loading pan against vertical displacement. Said ball frame is vertically pivoted to the forward end of an advancing member 77. Said advancing member, as herein shown, includes an I-beam 79 guided in supporting and guiding members 80 and 81. The supporting and guiding member 80 is adapted to be held in position on the ground by means of jacks 82 and 83 and is provided with a horizontal roller 82a, adapted to engage the inside of the web of said I-beam and form a slidable support therefor. A pair of spaced apart vertical guiding rollers 84, 84 are adapted to engage one flange of said I-beam, and a vertical guiding roller 85 is adapted to engage the opposite web of said I-beam.

The supporting and guiding member 81 is somewhat similar in construction to the supporting and guiding member 80 but is also provided with a motor 86, forming a source of power for feeding the face loading pan 30 towards or from the working face. Said supporting and guide member is adapted to be jacked in position on the ground by means of jacks 87 and 88.

The motor 86 is adapted to drive a winding drum 89 in the same manner that the winding drum 54 is driven from the motor 57. A flexible cable 90 is wrapped around said winding drum and is secured at its ends to opposite ends of the I-beam 79, for moving said I-beam with respect to said supporting and guiding members, in an obvious manner.

When the shaker conveyer pan line and reciprocating trough section 10 are positioned in the working place, preferably in the center of the working place, the loading pan 11 may be placed under the undercut and connected to the forward end of said reciprocating trough section by means of the clamps 12, 12. The loading pans 30, 30 may then be positioned a short distance from the working face and connected to the bell cranks 35, 35 so as to be driven therefrom. Vertical adjustment of the rear ends of said loading pans may be effected by means of the ball frames 76, 76. The number of loading pans arranged parallel to the working face depends upon the width of the working face and any desired number of loading pans may be provided. When the two loading pans are in position and the horizontal portion 14 of the loading pan 11 is positioned beneath the undercut, the coal is broken down onto said horizontal portion of said loading pan. The shaker conveyer is then started, the loading pan 11 conveying the broken down material rearwardly onto the reciprocating trough section 10. At the same time either one or both of the face loading pans 30, 30 may be started in operation. As herein shown, only one of said pans is in operation at a time. When the coal is broken down, a good deal of coal will roll down onto said face loading pans, and upon reciprocable movement thereof will be transferred to the loading pan 11. After this coal, which has been shot down onto the face loading pan 30, has been completely loaded out, the base 36 may be advanced by means of the winding drum 54 and the flexible cable 60. At the same time the loading pan 30 may be advanced by means of the flexible cable 90 and winding drum 89. This operation may be effected without stopping the conveyer and the clamp 63 may be released at the beginning of the return stroke and clamped at the end of the return stroke, to advance the drive link 62 and to properly position said drive link and bell crank at the end of the advancing operation. This loading and advancing operation may be continued until one side of the working place has been loaded out. The opposite loading pan may then be put into operation, for loading out the opposite side of the working place.

If desired, when the right-hand face loading pan 30 has finished its loading operation, this pan may be retracted to permit an undercutting machine to undercut the right-hand side of the working place, while the left-hand loading pan is performing its loading operation. Immediately after the left-hand loading pan has completed the cleaning out of the working place, the loading pan 11 may be disconnected from the reciprocating trough section 10 and moved backwardly. The left-hand loading pan 30 may likewise be moved backwardly so the cutting operation can be completed. The loading pans 30, 30 and 11 may then be put in position along the coal face during the drilling operation, thus providing a substantially continuous cutting and loading cycle.

It is of course understood that both loading pans may be advanced together, so loading may be effected from both sides of the trough line at the same time, if desired.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a face loading apparatus, a shaker conveyer trough line adapted to be extended into a working place, a face loading pan adapted to extend in parallel relation with respect to the working place, for loading material onto said trough line, a base adapted to be held stationary on the ground during operation of the conveyer, a bell crank pivotally mounted on said base for movement about a vertical axis, a drive connection between said trough line and said bell crank, and a drive connection between said bell crank and loading pan, for reciprocably driving said face loading pan and permitting said pan to be pivoted with respect to said bell crank during reciprocation thereof, means for advancing said loading pan into the material it is desired to load, and other means for advancing said base simultaneously with or independently of advancing movement of said loading pan.

2. In a face loading apparatus, a shaker conveyer trough line adapted to be extended into a working place, said trough line including a reciprocating trough section having an extensible trough section nested therein and adapted to be extended therefrom, a loading pan adapted to extend parallel to the working face and arranged to discharge material into said extensible trough section, means for advancing said loading pan, and means driven from said reciprocating trough section, for reciprocably driving said loading pan in its various advanced positions including a base, a bell crank mounted on said base, a drive connection from one arm of said bell crank to said loading pan, for reciprocably driving said loading pan, and an extensible drive connection from said reciprocating trough section to the other lever arm of said bell crank, for reciprocably driving said bell crank including a drive arm and clamping means, for detachably clamping said drive arm to said reciprocating trough section.

3. In a face loading apparatus, a shaker conveyer trough line adapted to be extended into a working place, intermediate the ribs thereof, said trough line including a reciprocating trough section having an extensible trough section nested therein and adapted to be extended therefrom, and having a forward end adapted to be inserted in an undercut in the working face and have the material it is desired to load shot directly thereon, a pair of face loading pans adapted to extend in opposite directions from said extensible trough section in substantially parallel relation with respect to the working face and having discharge ends overlapping said extensible trough section, means for advancing said loading pans independently of each other, a base on each side of said extensible trough section, and means mounted on said bases and driven from said reciprocating trough section, for reciprocably driving said loading pans in their various advanced positions.

4. In a face loading apparatus, a shaker conveyer trough line adapted to be extended into a working place, intermediate the ribs thereof, said trough line including a reciprocating trough section having an extensible trough section nested therein and adapted to be extended therefrom, and having a forward end adapted to be inserted in an undercut in the working face and have the material it is desired to load shot directly thereon, a pair of face loading pans adapted to extend in opposite directions from said extensible trough section in substantially parallel relation with respect to the working face and having discharge ends overlapping said extensible trough section, means for independently advancing said loading pans as the loading operation progresses, and means driven from said reciprocating trough section, for reciprocably driving said loading pans in their various advanced positions including a bell crank on each side of said loading pan, drive connections between opposite sides of said reciprocating trough section and said bell cranks, drive connections between said bell cranks and said face loading pans, and means for extending said bell cranks independently of advancing movement of said face loading pans and independently of each other.

5. In a face loading apparatus, a shaker conveyer trough line adapted to be extended into a working place, intermediate the ribs thereof, said trough line including a reciprocating trough section having an extensible trough section nested therein and adapted to be extended therefrom, and having a forward end adapted to be inserted in an undercut in the working face and have the material it is desired to load shot directly thereon, a pair of face loading pans adapted to extend in opposite directions from said extensible trough section in substantially parallel relation with respect to the working face and having discharge ends overlapping said extensible trough section, means for independently advancing said loading pans as the loading operation progresses, and means driven from said reciprocating trough section, for reciprocably driving said loading pans in their various advanced positions including a bell crank on each side of said loading pan, drive connections between opposite sides of said reciprocating trough section and said bell cranks and drive connections between said bell cranks and said face loading pans, a base for each of said bell cranks and forming a mounting therefor, and means for guiding said bases and for extending said bases independently of extension of said face loading pans.

6. In a face loading apparatus, a shaker conveyer trough line adapted to be extended into a working place, a face loading pan extending transversely of said trough line and adapted to deliver material onto said trough line and to extend in parallel relation with respect to the working place, a base at one side of said trough line and adapted to be slidably moved along the ground, means for holding said base in position and for slidably moving it along the ground, a bell crank pivotally mounted on said base and oscillatively driven by said trough line, and a drive connection between said bell crank and face loading pan, permitting angular movement of said loading pan along the ground with respect to said bell crank and advancing movement of said loading pan independently of said base and bell crank.

7. In a face loading apparatus of the class described, a shaker conveyer trough line adapted to be extended into a working place, a face loading pan extending transversely of said trough line and adapted to deliver material onto said trough line and to extend in parallel relation with respect to the working place, a base at one side of said trough line and adapted to be slidably moved along the ground, a bell crank pivotally mounted on said base and reciprocably driven by said shaker conveyer trough line, a drive connection between said bell crank and said face loading pan, permitting said loading pan to be advanced along the ground about said bell crank during reciprocation of the conveyer independently of advancing movement of said base and bell crank, and means for positively advancing said loading pan independently of advancing movement of said base.

TIMOTHY F. McCARTHY.